April 23, 1929.  L. W. BONNEY  1,710,672
AEROPLANE CONTROL
Filed Dec. 14, 1925   4 Sheets-Sheet 4
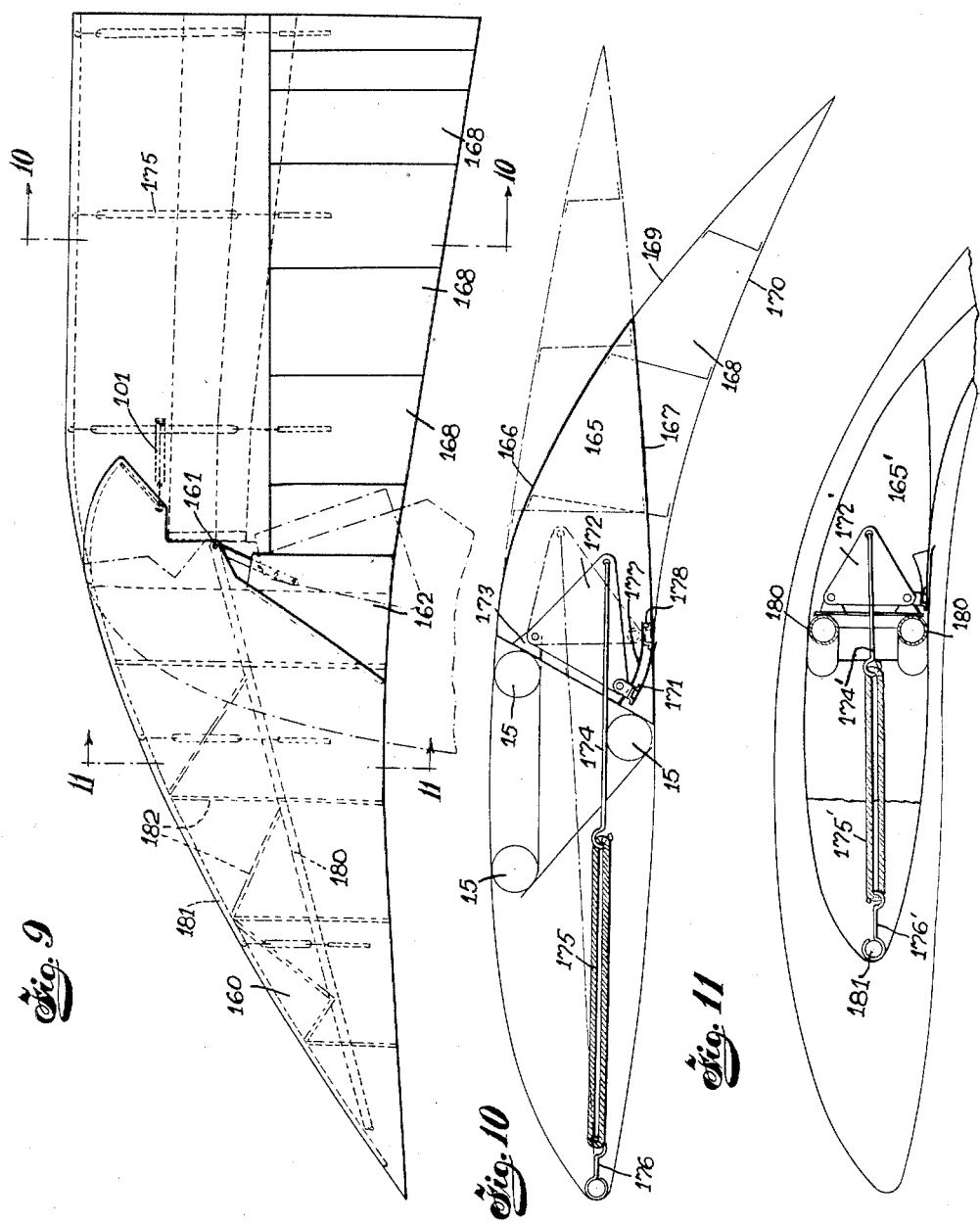
INVENTOR.
Leonard W. Bonney
BY Chas H. Keel
ATTORNEYS.

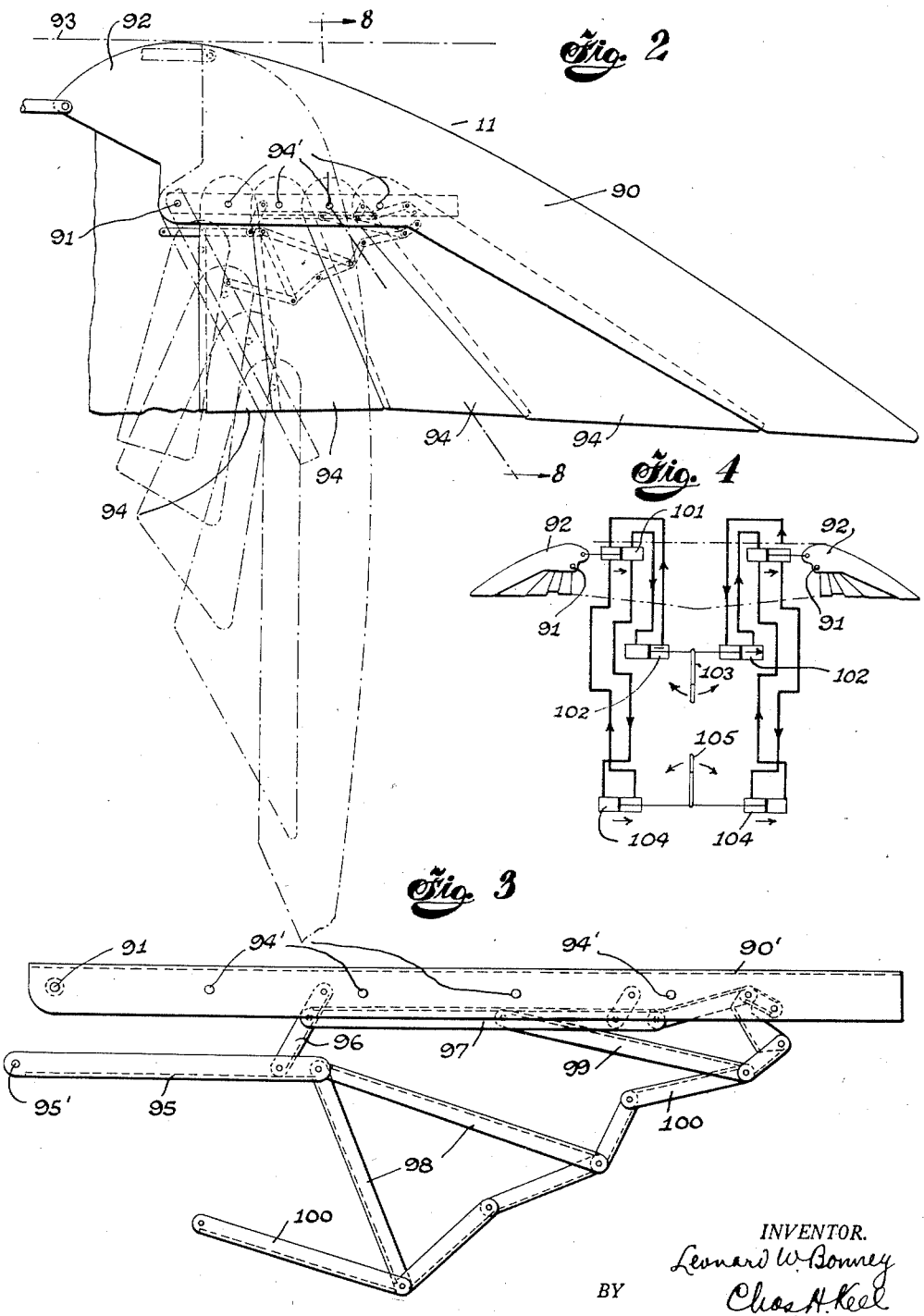

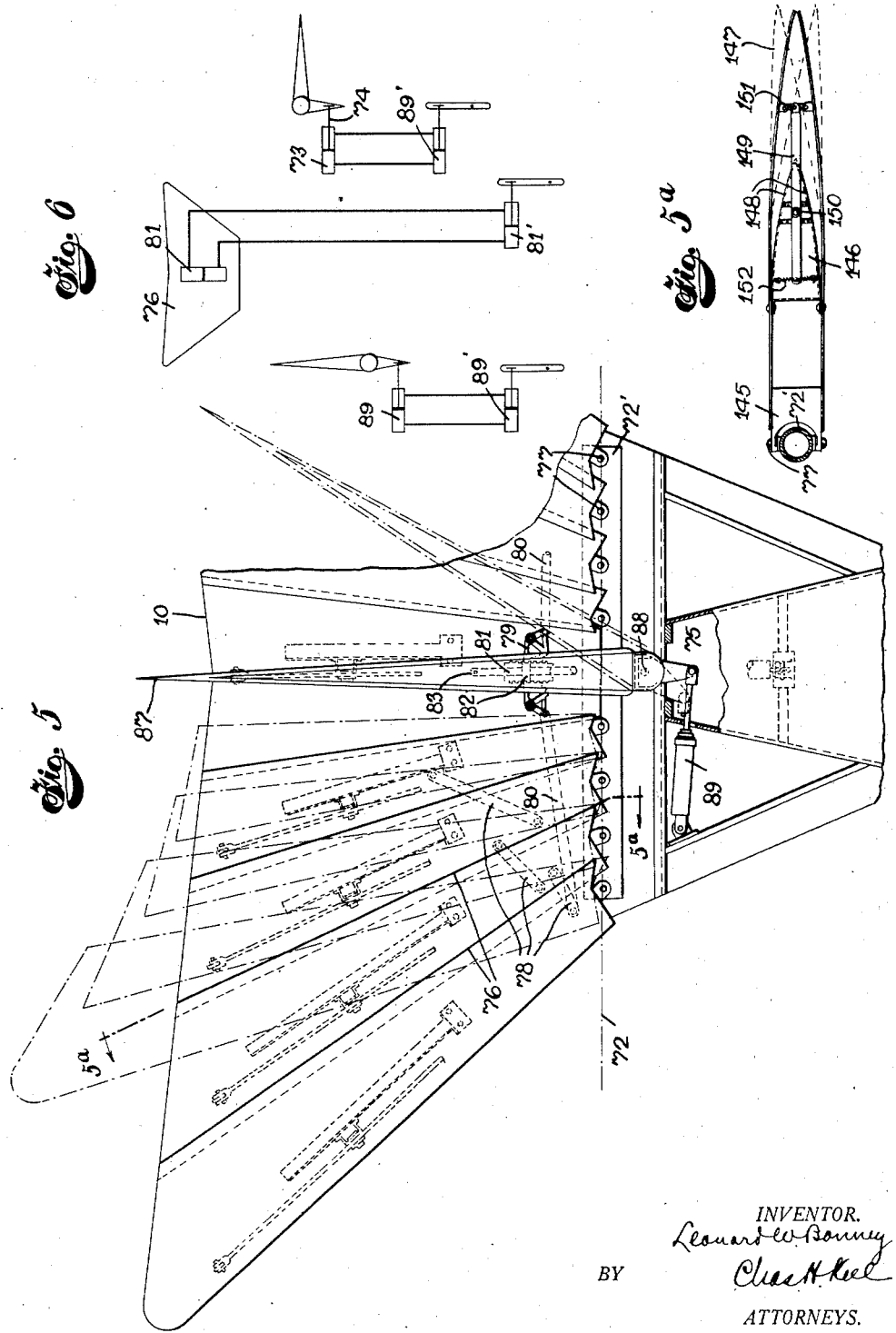

Patented Apr. 23, 1929.

1,710,672

UNITED STATES PATENT OFFICE.

LEONARD W. BONNEY, OF FLUSHING, NEW YORK; FLORA MacDONALD BONNEY EXECUTRIX OF SAID LEONARD W. BONNEY, DECEASED.

AEROPLANE CONTROL.

Application filed December 14, 1925. Serial No. 75,168.

This invention relates to aircraft of the heavier-than-air type.

The object of the invention generally is an aeroplane which is peculiarly characterized by the ease and readiness with which it may be controlled and maneuvered while in the air, and by its smooth flying qualities free from the vibrations and pitching characteristics of many prior planes. More particularly my invention resides in an aeroplane including flexible wing tips which are differentially variable to effect the lateral balance and which are also variable in the same direction to vary the aspect ratio of the craft for different speeds, and also including in combination therewith a novel horizontal tail elevator or fin unit whose effective surface is variable and whose angle may be varied in the usual manner of elevator control, together with an inherent flexibility of said controls, all of which contribute to the safe control of the craft while in the air and while landing. More particularly my novel flexible controls include a plurality of feather-like members telescopically arranged upon each other, which feathers may be of flexible character and are closable upon each other and openable out in fan-like fashion without interfering with the operating mechanism or the flexing mechanism.

A further object of the invention is a novel control mechanism for the ailerons wherein both the direct and differential variations of the ailerons may be effected with marked facility and whereby the correlated adjustments of the tail unit may be simultaneously varied.

Other objects of the invention reside in the various novel features of construction and control hereinafter set forth.

For a better understanding of my invention, reference may be had to the accompanying drawings forming a part of this application wherein:

Fig. 2 is an enlarged plan view of a wing tip,

Figure 8:
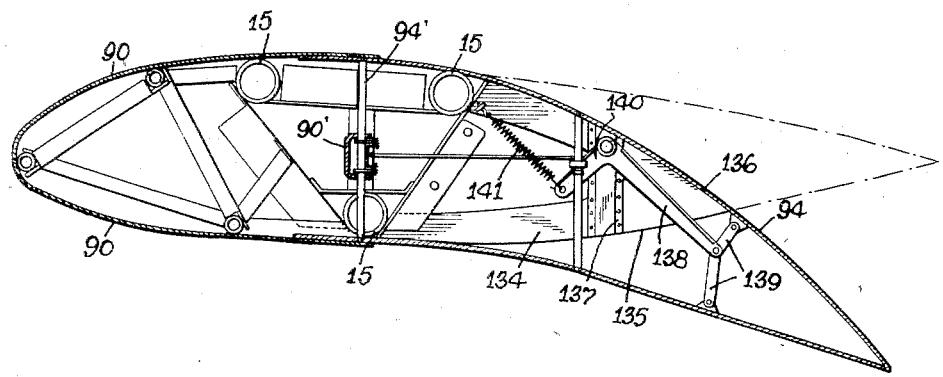
Figure 7:
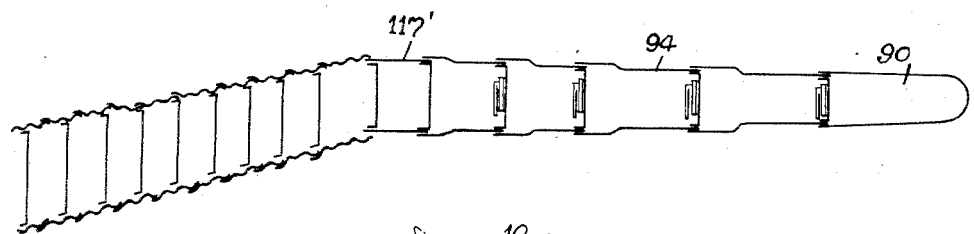
Figure 1:
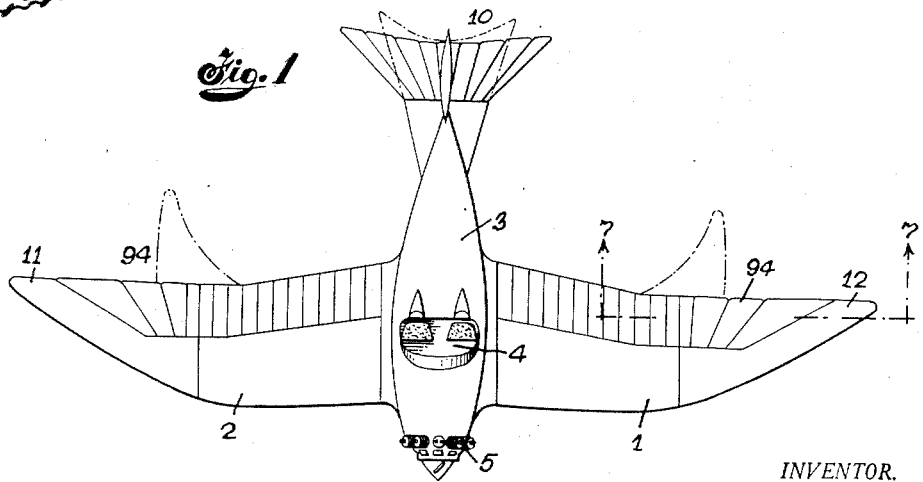
Fig. 1 is a plan view of an aeroplane embodying my invention.

Fig. 3 is a still further enlarged view of certain of the interconnections of the feather or fan-like members, Fig. 4 is a diagrammatic illustration of an operating system for the ailerons, Fig. 5 is an enlarged plan view of the tail unit, Fig. 5ª is a side view of the flexible mechanism for the tail feathers, Fig. 6 is a diagrammatic view of an operating system therefor, Fig. 7 is a diagrammatic sectional view along the line 7—7 of Fig. 1, Fig. 8 is a sectional view along the line 8—8 of Fig. 2, Fig. 9 is a diagrammatic plan view of modified wing tip, and Figs. 10 and 11 are diagrammatic sectional views along the lines 10 and 11 of Fig. 9.

Referring to the drawing where similar reference numerals designate similar parts throughout, I have illustrated my invention as embodied in an aeroplane of the monoplane type including the left and right hand wing sections 1 and 2 carrying a central main body 3. The latter contains at any suitable point a cockpit 4 for the pilot and passengers and carries at the front end any suitable motor 5. The aeroplane herein exhibited also includes a special tail unit including a flexible variable surface elevator 10 and flexible variable surface wing tips 11 and 12, these tips being differentially variable for assisting in effecting the lateral stability control and also variable in the same direction for the purpose of varying the aspect ratio of the plane to correspond to different operating speeds. The elevator surface 10 is also variable to increase and decrease its surface in addition to its regular elevator control action. The wing structure is built up around a triangular spar which forms the backbone of the wing and consists of the three tubular members 15 which are suitably braced between each other, this spar being substantially centrally disposed between the leading and trailing edges of the wing, and the wing tips 11 and 12 are carried on the outer ends of this main spar member 15—15.

In Figs. 2-4 inclusive I have indicated diagrammatically a reefing mechanism for the extensible and contractible wing tips 11 and 12. Each wing tip in the particular embodiment illustrated includes an elongated feather 90 which is pivoted at 91 to the wing structure, the root of such feather being in the form of or attached to a sector 92 which forms a continuation of the leading edge 93 of the wing in any adjusted position of the feathers. There are a plurality of auxiliary feathers 94 which are pivoted to the main feather 90 at the points 94' for pivotal movements relatively thereto. The feathers or blade-like members 90 and 94 may be extended as is shown in full lines to increase the wing surface, or they may be turned down to the position indicated in dotted lines to decrease the wing surface for higher speed operating conditions, or they may assume any intermediate point between the dotted positions and the full line positions indicated. The fan-like blades or feather members are linked together by the linkage system 95—100 so as to effect a gradual decreasing pivotal movement of the feathers from the outermost to the innermost weathers, the link 95 being pivotally fixed to the wing frame at 95' and being parallel to the line of pivotal connections 94'. These feathers or blade members 90 and 94 are preferably flexible so as to yield in the vertical direction in response to undue pressures exerted thereupon, and such flexibility may be secured, at least in part, by utilizing flexible material such for example as flexible metal. Added flexibility may be secured by special internal construction, such for example as the internal spring construction and mechanism hereinafter described in Figs. 8 and 9–11. As indicated in Fig. 1, and as described above, these wing tips 11 and 12 may be differentially operated to effect lateral control or may be operated in the same direction to vary the aspect ratio of the craft. For example, at extreme slow speed both tips 11 and 12 would be extended to the approximate position indicated in full lines, while for higher speed operations the feather or blade-like members 90 and 94 can be closed up by the pilot during flight to correspond to a higher speed operating characteristic. The pilot may vary the surfaces to any desired degree, and within the limits of the design such adjustments of the wing tips in the same direction to vary the aspect ratio do not interfere with the inverse or differential operation of the tips for lateral balance. I have indicated diagrammatically in Fig. 4 an outline of the main circuits of a hydraulic system for effecting the lateral balance and changing the aspect ratio. The sectors 92 are operated about their pivots 91 by means of the hydraulic cylinders 101. With these cylinders 101 there is connected a pair of hand control cylinders 102 together with a hand lever 103 for simultaneously actuating the pistons of the cylinders 101. By shifting the lever 103 in one direction or the other, the pilot simultaneously extends the wing tip on one side and closes it on the other for the purpose of correcting the lateral balance. For varying the aspect ratio or simultaneously extending or closing up the wing tips, I have illustrated diagrammatically a pair of cylinders 104 whose pistons are simultaneously operated by a hand lever 105, whereby the pilot may, during normal flight, extend or close the wing tips to the degree desired. Upon landing or launching where it is desirable to have the lifting surfaces as large as possible, ordinarily the wing tips 11 and 12 would be extended to their full maximum surface within the range of controllability for lateral control.

In Figs. 5 and 6 I have diagrammatically illustrated the tail unit of my novel aeroplane including the variable surface horizontal fin or elevator 10 for cooperation and functioning with the adjustment of the ring tips 11 and 12. The elevator 10 is mounted for pivotal movements about a horizontal axis 72 and may be operated in any suitable manner, preferably by the hydraulic cylinder 73 having its piston rod 74 pivotally attached to a bell crank lever 75 fixed in any suitable manner to the elevator, one end of the hydraulic cylinder 73 being pivotally attached in any suitable manner to the fuselage or frame work. The elevator 10 includes a multiplicity of feather or fan blade-like members 76 (diagrammatically illustrated) which are pivotally attached to the elevator support at the points 77 for adjustable movements in planes parallel with the axis 72. The feather or blade members 76 may be extended as illustrated in full lines, to increase the horizontal tail surface and elevator control, or may be closed up, somewhat similar to a fan, to the position indicated in dotted lines. They are connected together by a system of pivoted link connections 78 to provide a simultaneous shutting and opening movement thereof, the arrangement being such that the feather-like members 76 have an increasingly larger movement from the innermost to the outermost feathers. The actuation of these feathers may be effected in any suitable manner and in the particular embodiment shown I have indicated generally a pair of segmental gears 79 with link connections 80 pivotally connected to these gears at one end, and to the outermost feather-like member 76 at the other ends. The segmental gears 79 mesh with racks carried by a cylinder 81, the latter being carried by a fixed piston 82 and fixed hollow piston rod 83, whereby upon admission of hydraulic operating fluid to either side of the piston 82 and the simultaneous withdrawal from the other side, the cylinder 81 with the racks engaging the segmental gears may be moved back and forth to control the closing and opening of the fan-like feather members 76. Preferably the feather members 76 are of flexible character to give and yield in response to the controlling movements so as to smooth out the longitudinal control. Such flexibility may be secured by making them of a metal or other material having the required flexibility and resiliency or the flexibility of the feathers may be obtained or increased by a special construction, such for example as that diagrammatically indicated in Fig. 5ª, hereinafter described. At 87 I have indicated generally a rudder pivotally mounted on a vertical axis 88 for movements thereabout for effecting the usual controlling and steering movements in cooperation with the other controls. This rudder may be also hydraulically controlled as for example by the cylinder 89 having its piston rod suitably connected with the rudder to effect movements thereof. The rudder 87 may also be of the flexible construction indicated for the elevator. In Fig. 6 I have illustrated diagrammatically the various controls for the tail unit wherein the hydraulic cylinders 73, 81 and 89 are controlled respectively by the manual control cylinders 73', 81' and 89', suitable hand control levers being connected with the latter cylinders and suitable closed communicating connections being disposed between the cylinders.

By means of the tail unit shown, not only may it be operated about its horizontal axis to effect the levelling out of the plane when approaching the point of landing, but also the effective controlling and tail surface is capable of being enlarged to a substantial extent in conjunction with the above described substantial increase of the wing tip surfaces 11 and 12, whereby the stability and safety of the craft in landing are enhanced.

The particular construction of the wing tips 11 and 12 permitting the closing and opening of the feather-like members thereof is illustrated more or less diagrammatically in Figs. 5ª, 7–8, these illustrations indicating also the flexible construction and character thereof. In Fig. 7 I have indicated a diagrammatic sectional view showing the manner in which the covering of the adjacent feather members 94 telescope over each other when they are closed in the fan-like manner indicated in dotted lines in Fig. 2, and also the telescoping of the feathers 94 with the end wing feather 117', the internal mechanisms and structures of these feathers being indicated as disposed in positions to permit the telescoping of the adjacent feathers over each other. The flexible mechanism for the wing tip feathers 94 is indicated in Fig. 8 which is a sectional view along the line 8—8 of Fig. 2. Each feather is pivotally carried by the outer feather 90, as above described, the pivot points being indicated at 94', and includes an internal web-like or form member 134 having an under surface 135 and an upper surface 136 corresponding respectively to the curvatures of the particular wing tip feather in the uppermost and lowermost positions. Each feather web carries a vertically disposed bracket 137 and to this bracket is pivoted a bell crank lever for pivotal adjustments in the vertical or transverse plane, this bell crank lever including a long arm 138 pivotally connected at its free end to the two links 139 which are in turn pivotally connected to the upper and lower coverings of the feather 94 and a shorter arm 140 which is connected by a spring 141 with the inner end of the web-like member 134. This spring normally tends to hold the feather in its lowermost position, but upon increase of pressure thereunder, or a shift of center of pressure towards the rear, the spring yields to permit the straightening out and a change of curvature of the feather 94. Each web or form member 134 is cut away in its interior to save weight and to permit the link and link mechanisms connecting the adjacent members to pass freely therethrough in any position which the wing tip assumes when the feathers 94 are pivotally moved about their pivot points 94'. This feather tip mechanism is more or less diagrammatically illustrated, the details of construction being omitted for convenience in exposition.

In Fig. 5ª I have indicated more or less diagrammatically a sectional view along the line 5ª—5ª of Fig. 5, indicating the flexible or yielding character of the tail unit. Each of the tail feathers 76 includes a U shaped bracket 145 which is pivotally connected to the tubular shaft 72' at the points 77 for reefing adjustments in a plane parallel to the axis 72 of the tube 72'. Each of the brackets 145 carries a tapered web-like member 146 and the rear portion of the feather 76 is in the form of a tapered shell-like trailing edge 147 which is adjustable up and down in the manner indicated by the dotted lines in Fig. 5ª. The upper and lower edges 148 of the web-like member 146 form bearing surfaces and stops for the shell-like portion 147 in the lowermost and uppermost positions respectively. The flexible trailing portion 147 is normally maintained in its neutral position with reference to the main body of the feather by means of a mechanism including a lever 149 pivoted on the side of the web-like member 146 at the point 150 for adjustments in vertical planes, one end of this lever being connected to the shell-like portion 147 by means of the pivoted links 151 and the rear end being connected to the relatively fixed part of the feather, as for example the web 146, by means of the springs 152. These springs are so adjusted as to normally hold the lever 149 and the connected flexible trailing portion in the full line position indicated. These flexible mechanisms, as indicated in dotted lines in Fig. 5, are in a position to permit the telescoping of the tail feathers upon each other when they are closed and opened.

In Figs. 9–11 I have illustrated diagrammatically a modified wing construction and variable tip mechanism. In this case, instead of a multiplicity of wing tip feathers, I have provided one large pivoted feather 160 pivoted at 161 to the main wing frame, and an intermediate or auxiliary small feather 162 which is also pivoted to the main frame on an axis at 161, these two feathers 160 and 162 being adjustable in horizontal planes about the pivotal axis 161. Suitable linkage connections may be provided between the feathers 160 and 162 if desired for causing the two feathers to telescope upon each other and upon the end of the main wing structure when the hydraulic cylinder 101 is controlled or actuated to bring the feather 160 to the dotted position shown to vary the aspect ratio of the wing, but a preferable arrangement is to provide stops between the member 162 and the tip 160 and the last feather 168' to prevent the former from sliding off either of the latter, the member 162 simply floating between the positions indicated. The trailing portion of the wing and the trailing portion of the aileron 160 are flexible and are provided with a suitable yielding mechanism which permits the automatic straightening out and variation of the aerofoil curvatures upon increased pressure thereunder or a shifting of the center pressure. In Fig. 10 I have illustrated diagrammatically a side view of one of a number of similar flexing mechanisms disposed on the interior of the wing. These mechanisms include a plurality of spaced bulk head and stop members 165 which are fixed to the frame structure 15 of the wing and trail rearwardly therefrom. These members are in the particular embodiment illustrated of web-like construction and include upper and lower surfaces 166, 167 corresponding respectively to the upper and lower curvatures of the trailing portion of the wing corresponding to the low speed and maximum speed adjustments. The trailing portion of the wing comprises a multiplicity of feather-like metallic shells 168 which have a range of up and down movements corresponding to the full and dotted line positions indicated. The upper covering 169 of the shell is of course flexible and is united to or forms a continuation of the upper covering of the wing about the main wing frame structure 15. The lower covering 170 of the trailing portion of the wing is interrupted at a point adjacent the main frame 15 and to this there is secured a U shaped channel member 171 extending longitudinally of the wing. This member 171 is pivotally carried at the lowermost corners of the triangular shaped web-like members 172, the latter being pivotally carried at their uppermost corners by suitable brackets 173 fixed to the central wing frame construction 15. These web-like members 172 are adjustable about their pivotal points in vertical planes, and their rearmost corners which are disposed between the levels of the other corners are connected to the forward edge or nose structure of the wing by means of adjustable yielding mechanisms. In the particular embodiment shown these mechanisms include the links 174 and the flexible cord loops 175, the latter joining the forward end of the links 174 to the nose structure of the aeroplane by means of suitable link connections 176. By means of this construction the flexible cords 175 tend to maintain the trailing portion 168 of the wing in the downmost position indicated in full lines, but permits the upward adjustment of the trailing portion 168 upon increase of pressure thereunder or upon the rearward shifting of the center of pressure. The members 165 are cut away, as indicated at 177, at their inner ends and on their under surface to form stops 178, against which the member 171 may rest in the uppermost position of the trailing portion 168. It is to be noted that by reason of the particular arrangement shown, the line of pull of the cords 175 gradually approach the pivotal points 173 as the trailing portion of the wing moves upward, therefore resulting in a gradually decreasing effective pull thereof, and conversely in the opposite direction the effect is an increasing one due to the increase of the leverage arm.

The trailing portion of the aileron 160 may be of similar flexible construction to that of the wing. Fig. 11 shows a diagrammatic side view (part sectional) of one of such mechanisms included in the interior of this feather. One of the former are bulkhead members, 165' being illustrated in this figure, which bulkheads are suitably attached to the main wing tip beam 180. This beam carries a number of triangular members 172' which are pivotally carried by the beam 180 for adjustments in vertical planes in a manner similar to the adjustments illustrated in Fig. 10. Suitable flexible connections 174', 175', 176' are indicated as leading to the forward edge of the wing tip, these being similar to the correspondingly numbered connections of Fig. 10 and the flexing mechanism operating generally in a manner similar to the main wing flexing mechanism. The wing tip frame includes diagrammatic illustrations of the main beam 180 which is pivotally carried at 161 upon the main frame structure, the leading edge tube 181 and the rib-members 182.

As above indicated the variable surface wing tips permit the variation of the effective wing surface and the variation of the aspect ratio of the craft at the will of the pilot and by differentially actuating these variable wing tips, effective lateral control is obtained. The automatic extension of one wing with the accompanying increase in the effective leverage arm by itself or in combination with a corresponding decrease of the surface on the opposite side and a shortening of the arm thereon results in a peculiarly effective control, and, moreover, the lateral control effected in this manner is accomplished with a minimum of yaw since variations in the drag on the opposite sides of the main body due to the extension and decrease of the leading edge of the wing are not as pronounced as the corresponding variations in the drag of the usual lateral controls.

Having thus described my invention, what I claim and desire to protect by Letters Patent is the following:

1. An aileron for aeroplanes including a plurality of relatively pivoted and telescopically arranged feather members, one of said members constituting the extreme tip of the wing and pivoted to the wing frame and pivoted connecting links between the various feather-like members for effecting a gradually increasing pivotal movement from the innermost to the outermost feather-like members and means for actuating said feather-like members to close and open the same.

2. In an aeroplane, a wing divided longitudinally into root portions and end portions, the end portions being variable as to their effective surface, together with means for varying the surfaces of the ends differentially to effect the lateral stability of the craft and for varying the surfaces of the tips directly to substantially modify the aspect ratio in the variable surface end portions of the wing being of flexible and yielding character for the purpose set forth.

3. In an aeroplane a wing including variable surface end portions and a variable tail surface together with means whereby the surfaces of the ends and the tail may be simultaneously increased or simultaneously decreased, the variable end surfaces of the wing and the horizontal tail surface being both flexible and yielding for the purpose set forth.

In testimony whereof, I have signed my name to this specification.

LEONARD W. BONNEY.